A. STEINBART.
GAS SCRUBBER.
APPLICATION FILED NOV. 10, 1909.

965,248.

Patented July 26, 1910.
4 SHEETS—SHEET 2.

WITNESSES:
J. Herbert Bradley.
Theodore Duff.

INVENTOR
Alfred Steinbart
by Christy and Christy
Atty's

A. STEINBART.
GAS SCRUBBER.
APPLICATION FILED NOV. 10, 1909.

965,248.

Patented July 26, 1910.
4 SHEETS—SHEET 3.

WITNESSES:
J. Herbert Bradley.
Theodore Duff.

INVENTOR
Alfred Steinbart
by Christy and Christy
Atty

UNITED STATES PATENT OFFICE.

ALFRED STEINBART, OF PITTSBURG, PENNSYLVANIA.

GAS-SCRUBBER.

965,248.   Specification of Letters Patent.   Patented July 26, 1910.

Application filed November 10, 1909. Serial No. 527,280.

*To all whom it may concern:*

Be it known that I, ALFRED STEINBART, residing at Pittsburg, in the county of Allegheny and State of Pennsylvania, a citizen of the United States, have invented or discovered certain new and useful Improvements in Gas-Scrubbers, of which improvements the following is a specification.

The invention described herein relates to certain improvements in gas scrubbers which are hereinafter more fully described and claimed.

Figure 1:
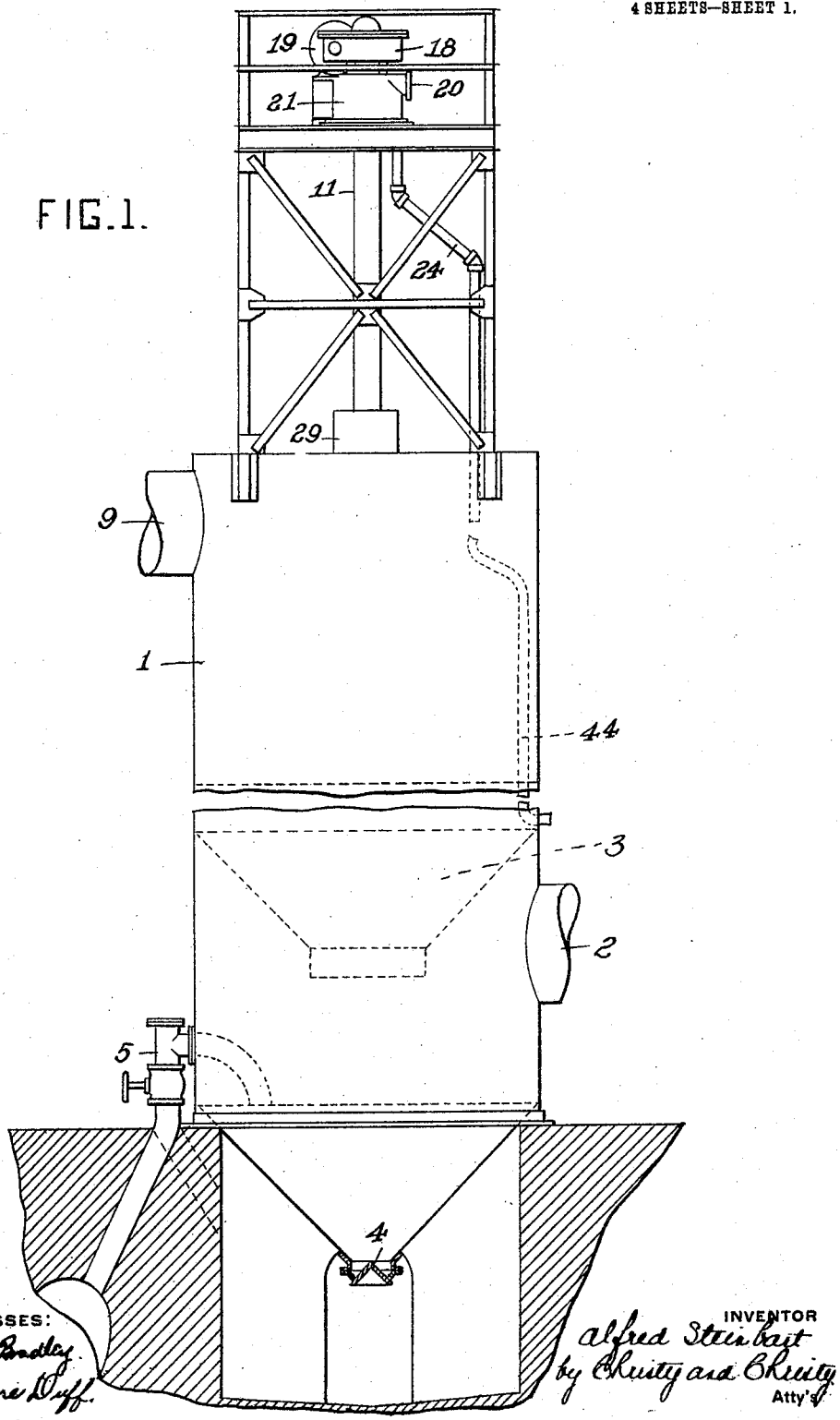
Figure 2:
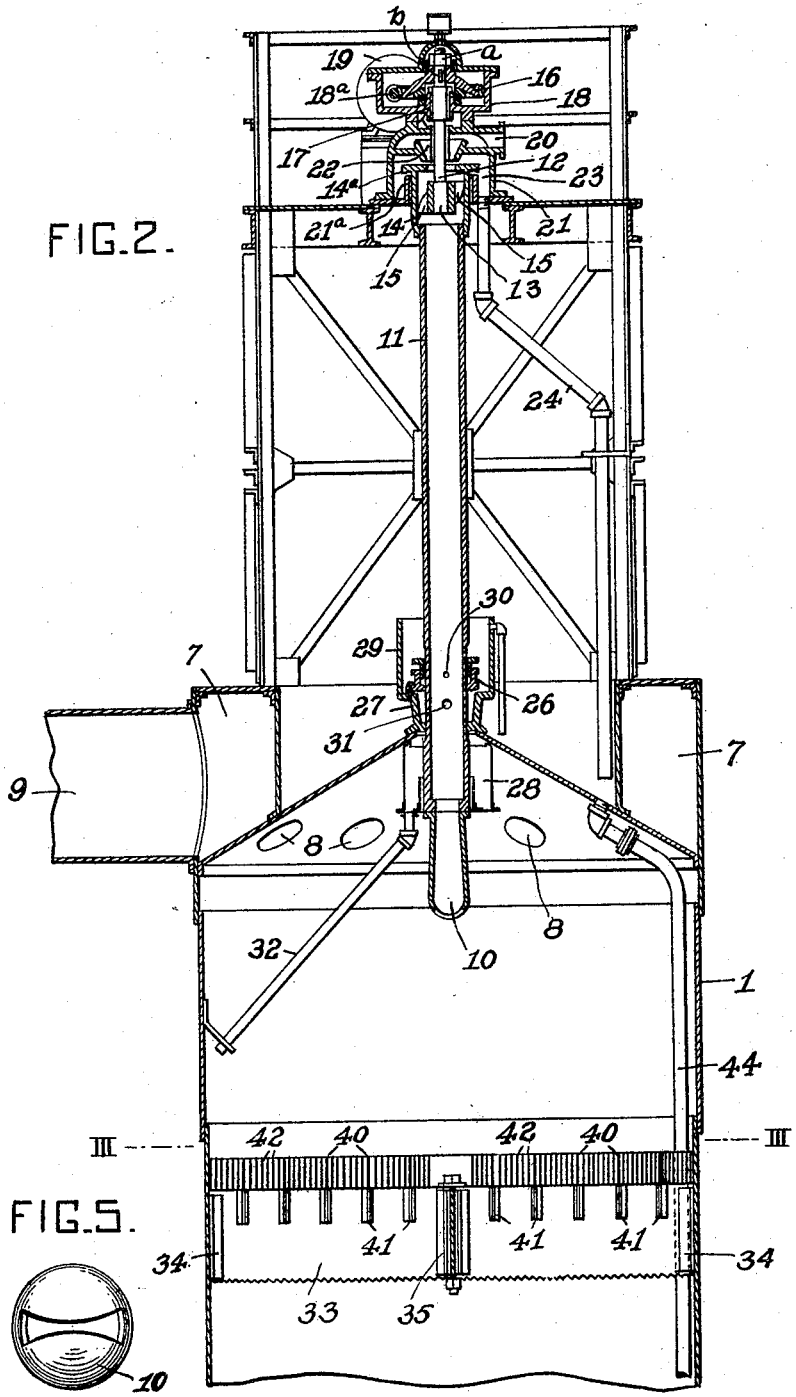
Figure 3:
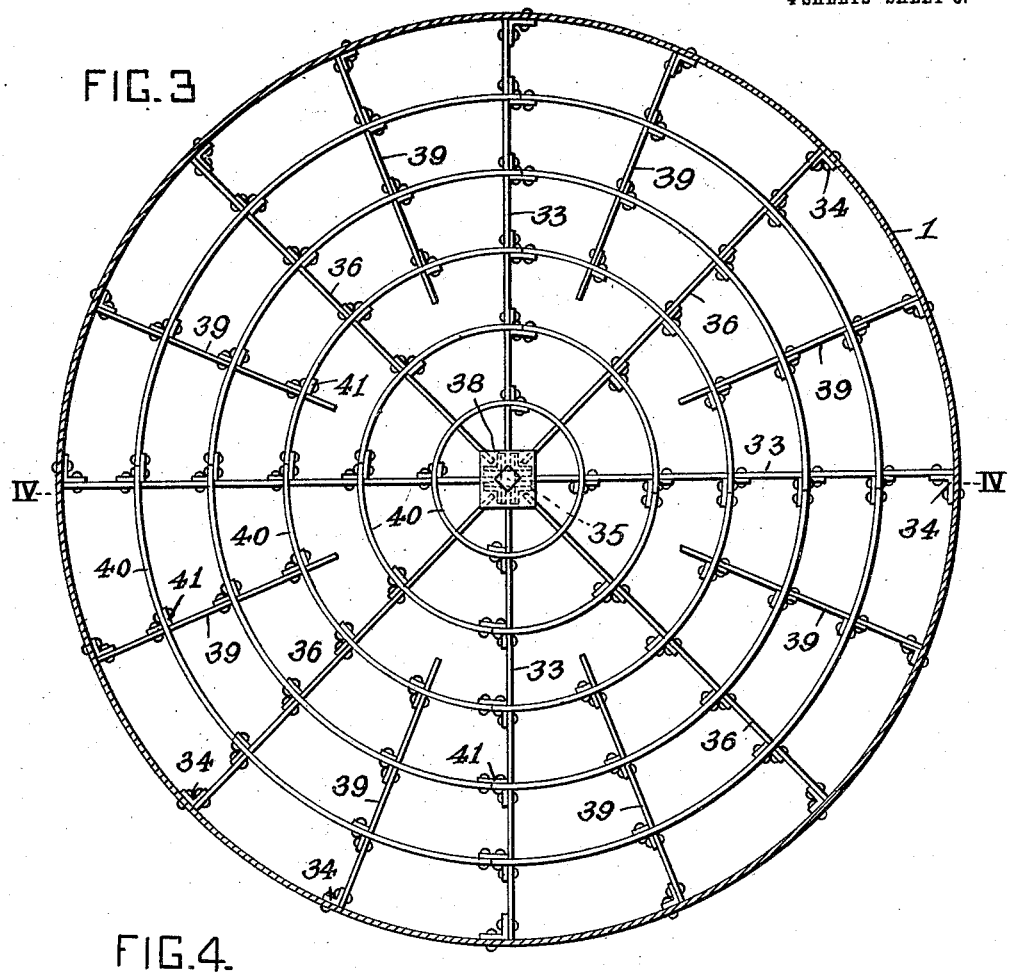
Figure 4:
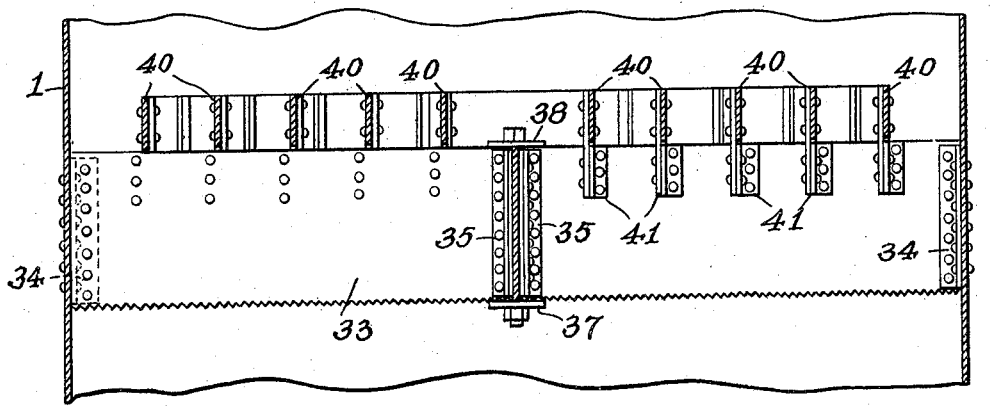
Figure 6:
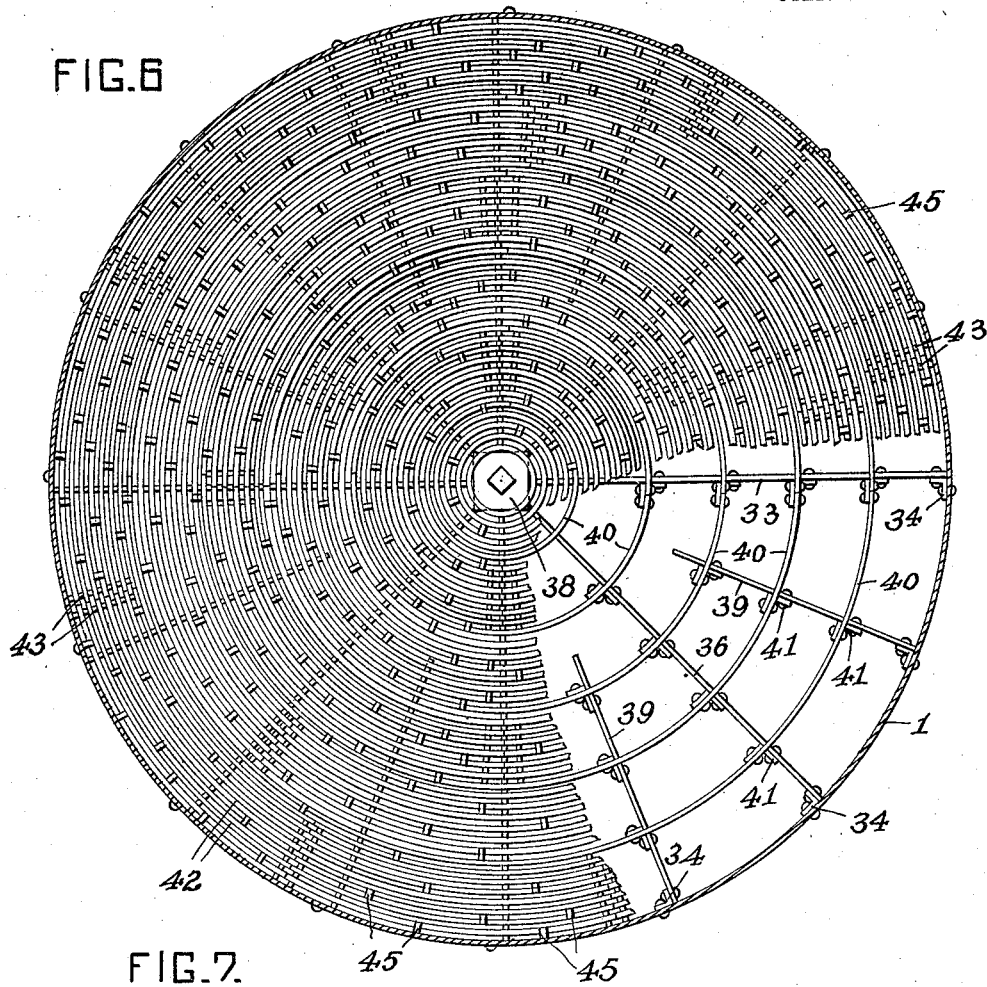
Figure 7:
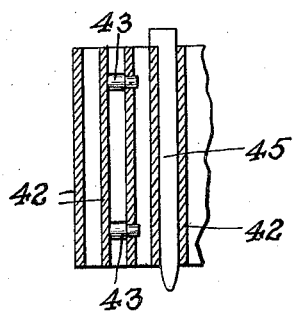

In the accompanying drawings forming a part of this specification, Figure 1 shows in elevation my improved scrubber; Fig. 2 is a sectional elevation of the upper portion of the scrubber, on an enlarged scale; Fig. 3 is a transverse section on a plane indicated by the line III—III Fig. 2 the hoops being omitted; Fig. 4 is a sectional view on a plane indicated by the line IV—IV Fig. 3; and Fig. 5 is a detail view showing the lower end of the discharge nozzle. Fig. 6 is a view similar to Fig. 3 showing the hoops in position on the transverse frame and Fig. 7 is a sectional detail view showing a few hoops and the manner of spacing them.

In the practice of my invention the scrubber consists of a metal shell 1 of suitable height—fifty or sixty feet more or less—provided at its lower end with a gas inlet nozzle 2 located below a conically shaped diaphragm 3 having a central opening for the upward flow of the gas and also for the downward escape of the water. The lower end of the shell is closed by a vertically movable valve 4 for the discharge of sediment, etc., into a sewer or other passageway. In order to prevent the water rising in the lower part of the scrubber shell above a suitable height, an escape pipe 5 is provided so constructed as to form a trap to prevent escape of gas through this outlet.

As shown in Fig. 2 the upper head of the shell is preferably made conical, though not necessarily so, and on this head is formed a bustle pipe 7 preferably extending entirely around the upper end of the shell near the outer edge of the head. This bustle pipe is connected with the interior of the shell by a series of ports 8 for the outward flow of gas and is provided with an outlet pipe 9 for conducting the gas to the point of use.

The water is admitted into the scrubber shell through a nozzle 10 secured to the lower end of a pipe 11 which is suspended on its upper end by means of a shaft 12 having its lower ends secured in the hub 13 integrally connected with a cap 14 by means of webs 15. This cap is secured to the upper end of the tube 11, and the upper end of the shaft 12 is detachably secured as by a nut $a$ and feather key $b$ to a rotating member 16 having a suitable bearing 17 in the box 18 which is supported on the frame work extending up from the top of the scrubber shell. It is preferred that the rotating member 16 should be made in the form of a worm wheel to intermesh with a worm $18^a$ driven by a suitable motor 19. The cap 14 is provided with a flange $14^a$ adapted to rest upon the annular flange $21^a$ when it is desired to detach the shaft 12 from the driving member 16. Water is introduced through the inlet opening 20 in the box-like frame 21 supported by the frame work, and flows from this passage through a funnel or conical opening 22 and an opening in the cap 14 and into the tube 11. The opening at the lower end of the conical portion 22 and that in the cap are made of such dimensions relative to the discharge openings in the nozzle attached to the pipe 11 that the latter may be kept full, thus insuring a constant head of water and a uniform discharge from the nozzle. In practice, water in excess of that escaping from the nozzle is supplied, and the excess escapes between the lower end of the conical member and the top of the cap and will be caught in a chamber 23 from which it will escape by a pipe 24 down into the receptacle formed on top of the scrubber shell by the annular bustle pipe 7. This overflow water is carried away by a pipe 44 which preferably extends down inside of the shell 1 to a point near the lower end of the latter, where it passes outside of the shell as shown in Figs. 1 and 2. The flow of water from this pipe affords an indication to the attendant that a sufficient supply is being received by the pipe 11.

The pipe 11 extends down through a stuffing box 26 and bearing blocks 27 formed of lignum vitæ or other suitable material, and through a chamber 28 arranged at the upper end of the scrubber shell. The stuffing box which may be of any suitable construction, is arranged in a shell 29 for the reception of water preferably supplied thereto through a port 30 in the pipe so as to maintain the packing in the stuffing box lubricated. The bearing surfaces formed by the lignum vitæ blocks 27 are lubricated with water preferably supplied through a port 31. This shell 29 is made of sufficient height to maintain a depth of water therein covering the stuffing box, thus forming a water seal to keep the stuffing box absolutely gas tight, and the water escaping down along the pipe 11 below the bearing blocks 27 will be caught in the chamber 28 from which it is conducted to the side of the scrubber by a pipe 32, so that this escaping water will not interfere with the spraying of the water employed for washing as hereinafter described. The water escaping from port 30 will keep the casing 29 full and overflowing and will thus protect the stuffing box from any gritty matter; and the water flowing from port 31 will wash all gritty matter from the bearing 27.

The nozzle 10 has a slot or opening in its lower end larger at its ends and gradually diminishing toward the axis of the nozzle so that a gradually increasing flow of water may be had from the axis of the nozzle outwardly. The nozzle is preferably made of approximately the same diameter as the pipe 11 so as to permit of its withdrawal from the shell as hereinafter stated. It is desirable that the water discharged into the shell should reach the sides thereof before impinging on the segregating diaphragm. It is undesirable to do this by the rotation of the nozzle or other water introducing means and hence the nozzle is so constructed that the ends of the slot or slots are highest so that when the nozzle is stationary the water will be discharged in a fan like sheet, the upper edges of such fan like sheet being at such an angle to the axis of the supply pipe as to impinge against the comminuting diaphragm at or approximately at its juncture with the shell. The pipe 11 and nozzle are rotated so as to cause the fan shaped stream, issuing from the nozzle and spreading to the outer edges of the rain making or comminuting diaphragm or partition arranged across the shell at a suitable distance below the nozzle, to move progressively over such diaphragm with sufficient speed that the supply of water is substantially continuous to all portions of the diaphragm. When the nozzle is rotated, as above stated, the fan like sheet is caused to assume a conical shape the cone having its apex coinciding with the axis of rotation and having a diameter where it is intersected by the diaphragm, at least equal to the diameter of the latter. As clearly shown in Figs. 3 and 4 this partition preferably consists of a series of radial arms 33 secured at their outer ends to angles 34 riveted to the shell of the scrubber and extending at their inner ends between angles 35 which are riveted to the radial strips and form the center member of the partition. A second series of radial strips 36 have their outer ends secured to the shell and their inner ends projecting into the several angles 35. The inner ends of these latter strips 36 are supported by a washer 37 and a bolt passing through said washer and a washer 38 resting on top of the angles. A third series of radial strips 39 extend from the shell inwardly between adjacent strips 33 and 36. A series of spacing rings 40 formed of sections and of suitable width are supported by these several radial strips. In order to properly space these dividing or spacing strips, posts 41 are secured to the several radial strips and extend up inside of the rings 40. The ends of adjacent ring sections are connected together by rivets which also connect them to the posts 41. Within the annular spaces formed by these rings 40 are placed a plurality of thin metal strips or hoops 42 which are also formed in sections and suitably spaced one from another to allow the passage of a thin sheet of water between them. As shown in Fig. 6 these hoops or rings 42 are made in sections and the end of each section has spacing knobs 43 secured thereto, the knobs being formed by the head of a rivet driven into the section. At points intermediate of the ends, adjacent sections are properly spaced by means of nails 45 having shanks of a width equal to the desired space between adjacent rings or hoops and the heads when the nails are placed in position rest on the top of the rings. By this construction these rings are equally spaced apart from the periphery into the center. The lower edges of all the rings are toothed in the manner and for the purpose described in Patent No. 774,207, granted to me October 8, 1904, i. e., to divide the sheet of water flowing down transverse of the rings, into drops and also preventing the formation of large drops due to the flow along the lower edges in case of an inequality in the position of the rings.

As will be readily understood, the capacity of the spaces between adjacent rings or hoops for the passage of water, increases with the diameter of those rings, but this increased capacity is supplied by the increased flow or increased thickness of the stream of water flowing from the nozzle which, as stated increases from the axis of rotation outwardly. By thus increasing the radial dimensions of the stream an approximately even flow of water through all portions of the dividing partition will be attained and the water thus flowing through the annular spaces in the partition will be divided into uniform fine rain-drops by the toothed lower edges of the rings.

This scrubber is principally used for the purifying of blast furnace gas. The operation of the blast furnace is continuous and cannot be interrupted except at a great cost. The gas therefore flows continually through the scrubber and it is not practicable on account of the high temperature, the dirt in the gas and also on account of the large quantity of gas to by-pass the gas by means of valves around the scrubber so that repairs may be made to the latter. It is therefore necessary to so construct and arrange the nozzle and its parts that repairs may be effected without removing the nozzle or providing an opening for the escape of the gas from the scrubber. It will be observed that the mechanism for directing the water into the scrubber shell is wholly outside the shell excepting the nozzle, and that the bearing 17 and worm wheel 16 may be removed while the flange on cap 14 rests on the support 21ª thereby holding the nozzle in position.

The stuffing box 26 and the lignum vitæ bearing 27 may be replaced without escape of gas from the washer, as the water issuing from the ports 30 and 31 keeps the seal 29 filled with water. The water and gas may be kept on the scrubber and the gas will not damage the scrubber, while repairs can be made without danger to the mechanics by the poisonous gas.

By the employment of the annular bustle pipe connected by a plurality of ports to the scrubber the direction of flow of gas is not at any point diverted and the flow of gas through the comminuting diaphragm will be approximately uniform at all points.

It is desirable that the water should reach the comminuting diaphragm as little broken, as possible, into drops or spray. Hence a low speed of rotation of the introducing and distributing means is desirable as centrifugal action will tend to break the water into drops or spray. By employing water introducing means, so constructed that by pressure alone the water will extend from a comparative small nozzle to the periphery of the comminuting diaphragm the rate of rotation for distributing the water over the entire surface can be kept low thereby avoiding to a very large degree the breaking up of the sheet into spray as it changes to a conical form.

I claim herein as my invention:

1. In a gas scrubber, the combination of a shell having gas inlet and outlet ports at or adjacent to its lower and upper ends respectively, a water supply pipe extending into the shell, means for rotating the pipe, a part of said means serving as a support for the pipe.

2. In a gas scrubber, the combination of a shell having a gas inlet at or adjacent to its lower end, an annular pipe provided with an outlet and forming a portion of the top of the shell, and connected thereto by a plurality of spaced ports through the wall common to the annular pipe and shell.

3. In a gas scrubber, the combination of a shell having inlet and outlet ports at its lower and upper ends respectively, a pipe for the introduction of water extending into the shell, a nozzle having its lower end radially slotted for the discharge of water and means for rotating the pipe.

4. In a gas scrubber, the combination of a shell having inlet and outlet ports at its lower and upper ends respectively, a pipe for the introduction of water extending into the shell, a nozzle having its lower end radially slotted for the discharge of water said slots increasing in width outwardly and means for rotating the pipe.

5. In a gas scrubber, the combination of a shell having inlet and outlet ports at its lower and upper ends respectively, a pipe for the introduction of water extending into the shell, a nozzle having its lower end radially slotted for the discharge of water, the outer portions of the slot of greater width than the inner portions and means for rotating the pipe.

6. In a gas scrubber, the combination of a shell, a diaphragm or partition arranged transverse of the shell, said diaphragm consisting of thin hoops closely adjacent one to the other, and arranged in a common plane, and rotating means for directing water in a fan like sheet onto said partition in quantities proportional to the areas between the hoops.

7. In a gas scrubber the combination of a shell, a diaphragm or partition arranged transverse of the shell and provided with a multiplicity of small passages or openings therethrough and rotating means for directing water in a fan like sheet onto said partition in quantities proportional to the aggregate areas of openings in the different parts of the diaphragm.

8. In a gas scrubber, the combination of a pipe having an open upper end, means connected to a water supply and arranged to direct water into the pipe, and a distributing nozzle connected to the pipe and arranged to discharge into the scrubber and a receptacle arranged to receive overflow from the open upper end of the pipe and provided with a discharge pipe.

9. In a gas scrubber, the combination of a rotating pipe extending into the scrubber, a distributing nozzle connected to the pipe, a stuffing box surrounding the pipe, a receptacle surrounding the stuffing box and means for supplying water to the receptacle.

10. In a gas scrubber, the combination of a rotating pipe extending into the scrubber, a nozzle connected to the pipe, a bearing for the pipe attached to the shell of the scrubber, a receptacle inclosing the lower end of the bearing and means for supplying water to the receptacle.

11. In a gas scrubber, the combination of a pipe, means disconnected from the pipe for introducing water thereinto, a rotary member, means for detachably connecting the pipe to such member adapted to normally support the pipe, and means for supporting the pipe when disconnected from the rotary member.

12. In a gas scrubber, the combination of a pipe extending into the scrubber, and provided with a distributing nozzle, a shaft connected to the pipe, a rotary member detachably connected to and adapted to normally support the shaft, a cap provided with a flange connected to the pipe and a stationary support for the flange.

13. In a gas scrubber, the combination of a shell, a spider arranged transverse of the shell, spacing rings rigidly secured to the spider, a plurality of thin hoops or rings arranged intermediate of the spacing rings and supported by the spider and spacing means interposed between adjacent hoops.

14. In a gas scrubber the combination of a shell having inlet and outlet ports at its lower and upper ends respectively, means for introducing water into the shell, a nozzle connected to such means and having its lower end radially slotted for the discharge of water, the outer portions of said slot being above a plane at right angles to the axis of the nozzle and tangential to its lower ends, and means for rotating the nozzle.

15. In a gas scrubber, the combination of a shell having inlet and outlet ports at its lower and upper ends respectively, a pipe entering through an opening at the upper end of the shell, a distributing nozzle having an external diameter not greater than the external diameter of the pipe connected to the latter, and means for rotating the nozzle.

16. In a gas scrubber, the combination of a shell having inlet and outlet ports at its lower and upper ends respectively, and means adapted to introduce water in a sheet form into the shell and to cause the water discharged into the shell to assume a conical form.

17. In a gas scrubber the combination of a shell provided with inlet and outlet ports at its lower and upper ends respectively a water supply pipe extending into the shell and provided with discharge openings adapted when the pipe is stationary to cause the water discharged into the shell to spread out radially in opposite directions from the axis of the pipe and from a fan like sheet of water.

18. In a gas scrubber, the combination of a shell provided with inlet and outlet openings at its lower and upper ends respectively, rotatable means for introducing water into said shell and provided with a discharge opening so shaped that on the rotation of such means the discharged water will assume a conical form, the apex of the cone being coincident with the axis of rotation of the water introducing means.

In testimony whereof, I have hereunto set my hand.

ALFRED STEINBART.

Witnesses:
ALICE A. TRILL,
FRANCIS J. TOMASSON.

Correction in Letters Patent No. 965,248.

It is hereby certified that in Letters Patent No. 965,248, granted July 26, 1910, upon the application of Alfred Steinbart, of Pittsburg, Pennsylvania, for an improvement in "Gas-Scrubbers," an error appears in the printed specification requiring correction as follows: Page 4, line 61, the word "from" should read *form;* and that the said Letters Patent should be read with this correction therein that the same may conform to the record of the case in the Patent Office.

Signed and sealed this 30th day of August, A. D., 1910.

[SEAL.]

F. A. TENNANT,
*Acting Commissioner of Patents.*